United States Patent [19]
Adamski et al.

[11] 3,810,210
[45] May 7, 1974

[54] FILM UNIT PROCESSING MECHANISM

[75] Inventors: Henry S. Adamski, Webster;
Guilford E. Kindig, Rochester, both of N.Y.

[73] Assignee: Eastman Kodak Company, Rochester, N.Y.

[22] Filed: July 5, 1972

[21] Appl. No.: 268,948

[52] U.S. Cl. .................................. 354/86, 354/83
[51] Int. Cl. ........................................ G03b 17/50
[58] Field of Search .................. 95/11 R, 13, 19, 22

[56] References Cited
UNITED STATES PATENTS

| | | | |
|---|---|---|---|
| 3,709,122 | 1/1973 | Blinow et al. | 95/13 X |
| 3,563,145 | 2/1971 | Bendoni et al. | 95/13 |
| 408,596 | 8/1889 | Eastman | 95/11 |
| 3,673,939 | 7/1972 | Harvey | 95/13 |
| 3,590,707 | 7/1971 | Merz | 95/13 |
| 3,134,317 | 5/1964 | Land | 95/13 X |
| 3,511,152 | 5/1970 | Erlichman | 95/13 |

*Primary Examiner*—Fred L. Braun
*Attorney, Agent, or Firm*—William C. Dixon

[57] ABSTRACT

A camera adapted to use a film cartridge containing a plurality of film units that are successively exposable and then processable by being transported through a nip between a pair of juxtaposed pressure members is provided with an improved mechanism, preferably operated by a lanyard, for transporting each film unit from the cartridge into and through the nip to initiate processing of the unit, to separate the image-recording portion of the unit from waste elements thereof, and to return the waste elements to the cartridge; the mechanism has no exposure and double-exposure prevention capability and coordinates the various functions performed.

2 Claims, 20 Drawing Figures

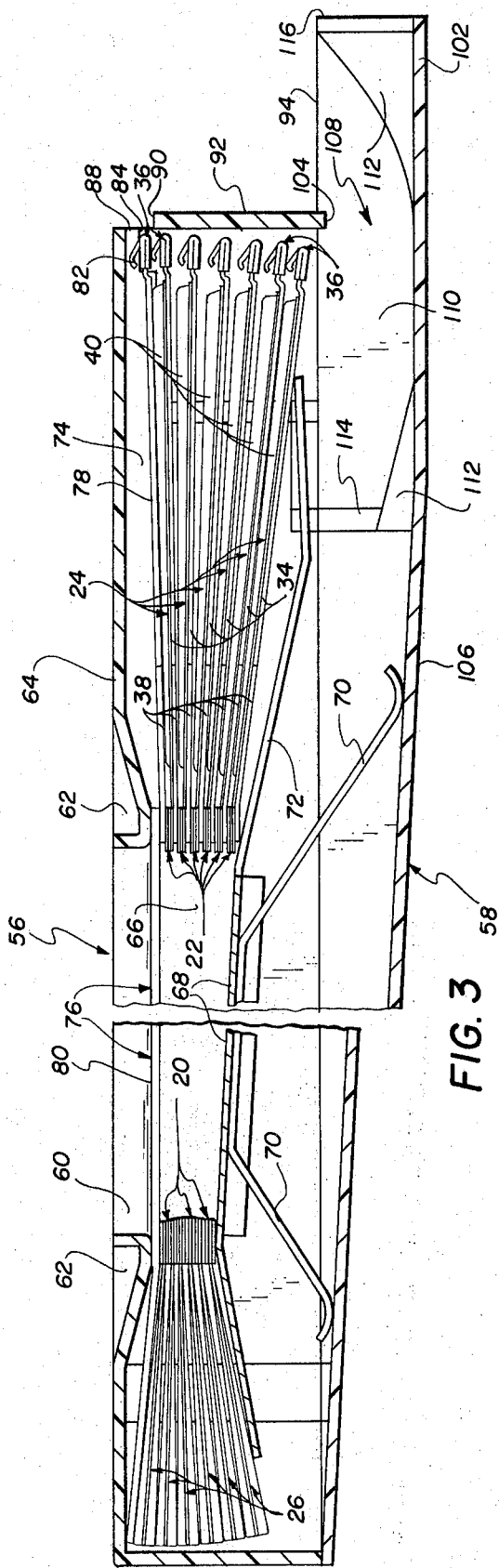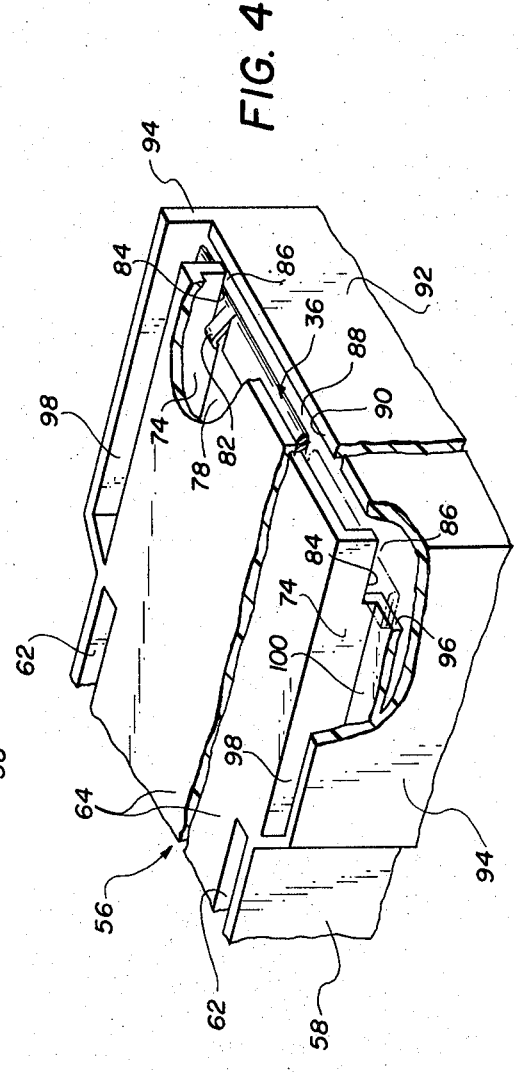

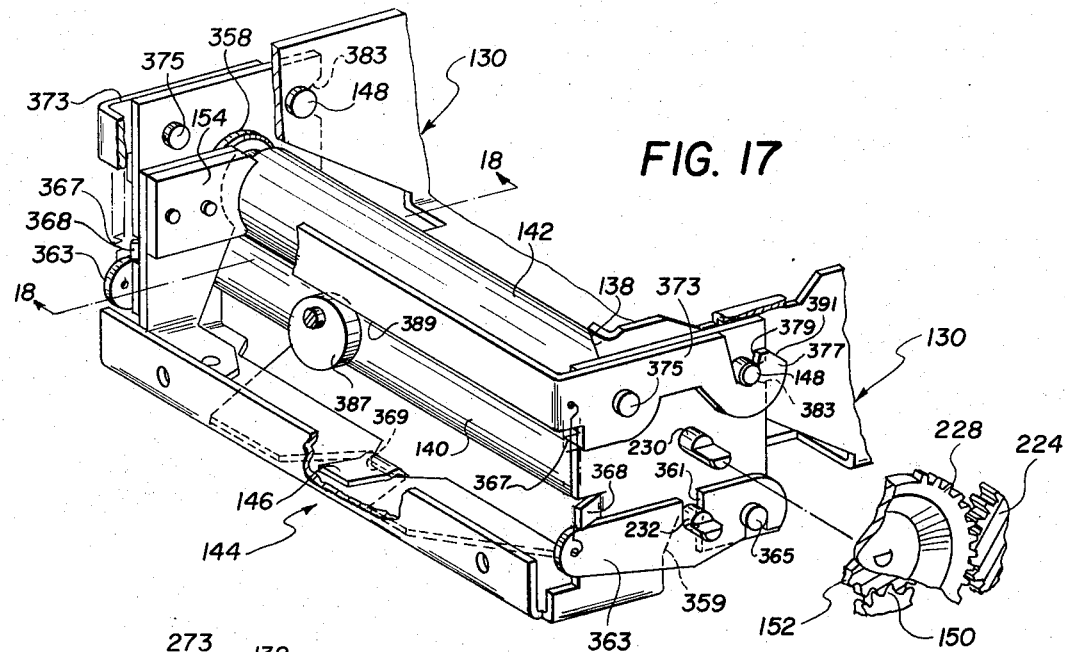
FIG. 17
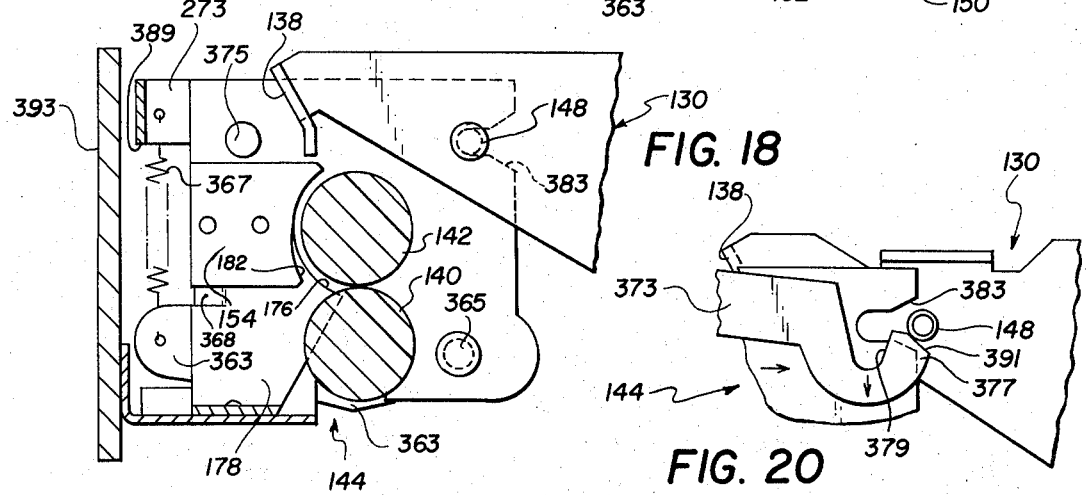
FIG. 18
FIG. 20
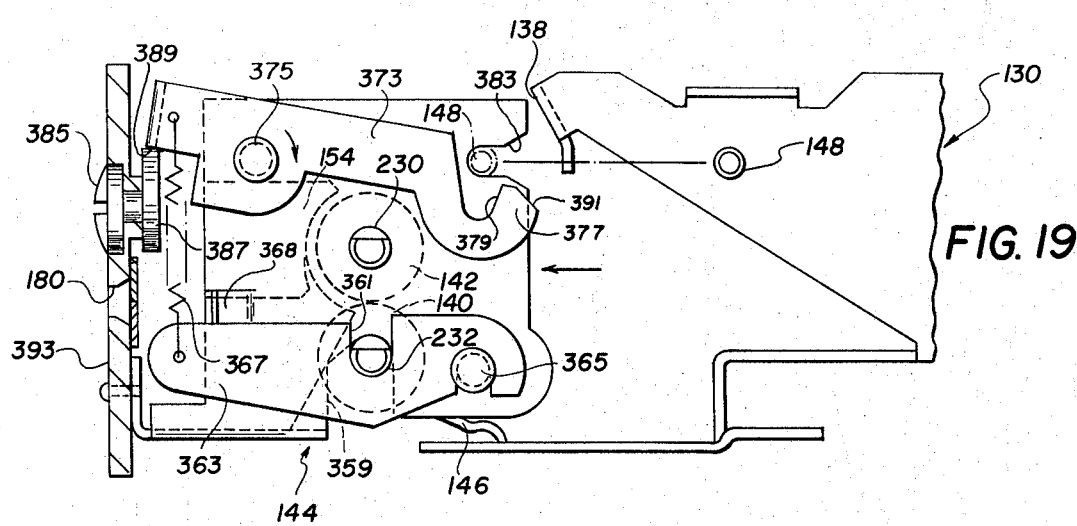
FIG. 19

FILM UNIT PROCESSING MECHANISM

CROSS-REFERENCE TO RELATED APPLICATIONS

Reference is made to the following commonly assigned, copending U.S. patent applications, all filed concurrently with this application:

Ser. No. 268,940 entitled FILM HANDLING IMPROVEMENT, Ser. No. 268,932 entitled PHOTOGRAPHIC FILM UNIT, and Ser. No. 268,930 (now U.S. Pat. No. 3,762,290) entitled PRINT SEPARATING DEVICE FOR PROCESSING CAMERA, all filed in the name of Donald M. Harvey; and Ser. No. 268,974 entitled FILM UNIT DIVERTER BAR WITH COLLAPSIBLE SPACER MEANS, filed in the name of Henry J. Bartnick.

BACKGROUND OF THE INVENTION

The present invention relates generally to cameras usable with film cartridges containing a plurality of film units that are successively exposable and then processable by being transported through a nip between a pair of juxtaposed pressure members, and specifically to an improved mechanism for transporting each film unit into the nip and for rotating at least one of the pressure members to transport that unit through and out of the nip.

The type of camera to which the present invention relates is adapted to be loaded with a film cartridge containing a stack of individual film units, each of which includes a generally rectangular, photosensitive image-recording portion or print card comprising two superposed sheets, the print card being separably coupled at its leading edge portion to a processing portion or pod assembly comprising a rupturable pod of processing fluid permanently coupled at its leading edge portion to a transverse stiffening member which defines the leading end of the film unit. After the print card of each film unit has been exposed, the unit is transported endwise out of the cartridge and into the nip defined by a pair of juxtaposed, rotatable pressure members, at least one of which then transports the unit through and out of the nip. Beyond the nip, the stiffening member is engaged by guide means that direct it in an arcuate path partially around one of the pressure members and into a storage compartment in the cartridge. As the pod passes through the nip, internal hydraulic pressure developed inside the pod ruptures a sealed area thereof and causes the processing fluid to flow between the two sheets of the print card. As the print card emerges from the nip, because of its inherent stiffness it tends to move endwise in a substantially straight path toward the camera exterior rather than follow the pod's arcuate path partially around the one pressure member. The leading edge portion of the print card thus pulls free of the pod, and continued movement of the card through the nip causes the processing fluid to be distributed uniformly between the two sheets and across the image area thereof, and thence into an excess-fluid-receiving trap coupled to the trailing edge portion of the card. The successively exposed film units are all processed in the same manner, and their exhausted pods are directed to the storage compartment in stacked relation to one another. After all of the available film units have been exposed and processed, the cartridge containing the empty pods can be removed from the camera and discarded, thereby eliminating any need for the photographer to handle the pods.

To feed the successive film units into the nip, the camera is provided with a mechanism that includes a reciprocable feeder member having a pair of fingers which enter the cartridge and engage the outer ends or tips of the stiffening member of the forwardmost film unit so that movement of the feeder member toward the pressure members urges that unit into the nip. During each operating cycle, the feeder member moves from a first position to a second position and then back to the first position to feed a film unit into the nip and to restore the mechanism to a condition for initiating the next cycle. Such a mechanism is disclosed in the above-cross-referenced U.S. Pat. application Ser. No. 268,940. In that application, such a mechanism is depicted as comprising a feeder member that is manually movable independently of the mechanism by which the pressure members are rotated. To eliminate the separate manual operation and possible malfunctioning that might occur as a result of improper movement of the feeder member, there could be provided an arrangement that encompasses a fully automatic mechanism by which movement of the feeder member is coordinated mechanically with the pressure member rotating mechanism, which, in turn, could be controlled by electrical switching means associated with a battery-powered drive motor. Because of the electrical means there employed, however, such a mechanism would not lend itself to an inexpensive, manually operatable camera of the type to which the preferred embodiments of the invention is directed.

SUMMARY OF THE INVENTION

The principal object of the present invention is to provide a camera of the above-described type with a simple and reliable automatic processing mechanism especially suited for manual operation, preferably by means of a lanyard.

Another object of the invention is to provide such a mechanism which automatically ensures correctly timed coordination among the various functions performed by the mechanism, to prevent malfunctioning which might otherwise result from improper operation of the mechanism by the photographer.

Still another object is to provide such a mechanism with automatic non-exposure and double-exposure prevention capability.

Briefly, the foregoing and other objects are accomplished by providing a processing mechanism constructed in accordance with the present invention, the preferred embodiment of which includes a rotatable power-input member in the form of a spring-loaded drum or barrel or spool that is adapted to be rotated by manual withdrawal of a lanyard wound thereon. The drum or spool is geared to a pair of juxtaposed rotatable pressure members, so that complete withdrawal of the lanyard effects rotation of those members through a predetermined number of revolutions. When the lanyard is released, the spring-loaded drum or spool is rotated in the opposite direction to rewind the lanyard thereon. A single-revolution clutch engageable with the drum or spool and coupled to a reciprocable film unit feeder device is first engaged to cause the feeder device to reciprocate during withdrawal of the lanyard, and is then disengaged after the feeder device has performed its function and returned to its initial position. Once the clutch has become disengaged, it cannot be reengaged until the next film unit has been exposed, thereby allowing the lanyard to be pulled repeatedly, if desired, without effecting further movement of the feeder device.

Various means for practicing the invention and other advantages and novel features thereof will be apparent from the detailed description of the preferred embodiment of the invention presented below.

BRIEF DESCRIPTION OF THE DRAWINGS

In the detailed description of the preferred embodiment of the invention presented below, reference is made to the accompanying drawings wherein like reference numerals denote like elements and wherein:

FIG. 3 is an enlarged cross-sectional view, taken along line 3—3 of FIG. 2, of the film pack shown in FIG. 2, with a central portion thereof removed to illustrate the film units and other internal elements of the film pack;

FIG. 4 is a partial perspective view of the film pack shown in FIGS. 2 and 3, with portions thereof broken away for clarity of illustration;

FIG. 17 is a partial perspective view of a subassembly of the processing mechanism which is removable from the camera for cleaning;

FIG. 18 is an enlarged cross-sectional view, taken along line 18—18 of FIG. 17, of the removable subassembly;

FIG. 19 is an enlarged elevational view of the subassembly shown in FIG. 17, illustrating the manner in which the subassembly is removed from the camera; and FIG. 20 is an enlarged elevational view of a portion of the subassembly shown in FIG. 17, illustrating the manner in which the subassembly is reinserted into the camera.

DESCRIPTION OF THE PREFERRED EMBODIMENT

Because photographic cameras and film units of the selfprocessable type are well known, the following description is directed in particular to elements forming part of, or cooperating directly with, the present invention, elements not specifically shown or described herein being selectable from those known in the art.

Figure 1:
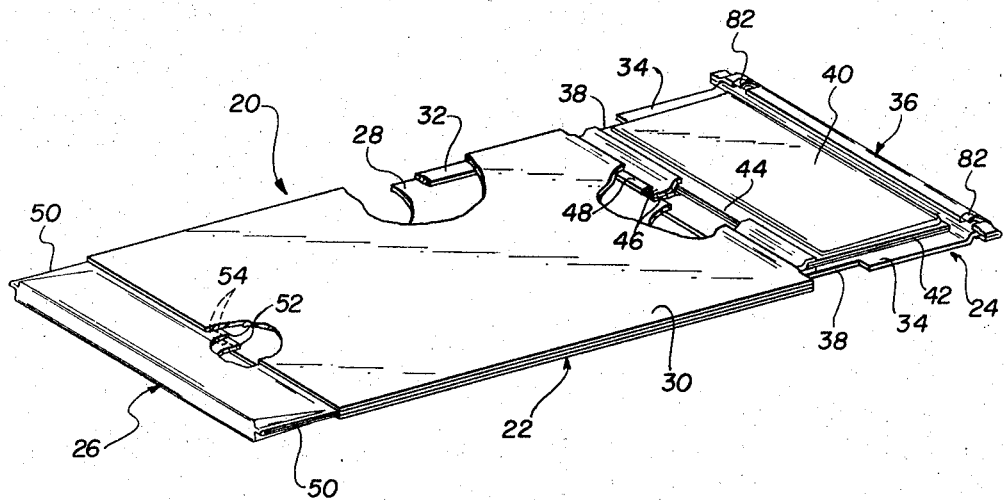
FIG. 1 is a perspective view of a self-processable film unit of the type used in conjunction with the present invention, with portions thereof broken away for clarity of illustration.
Figure 2:
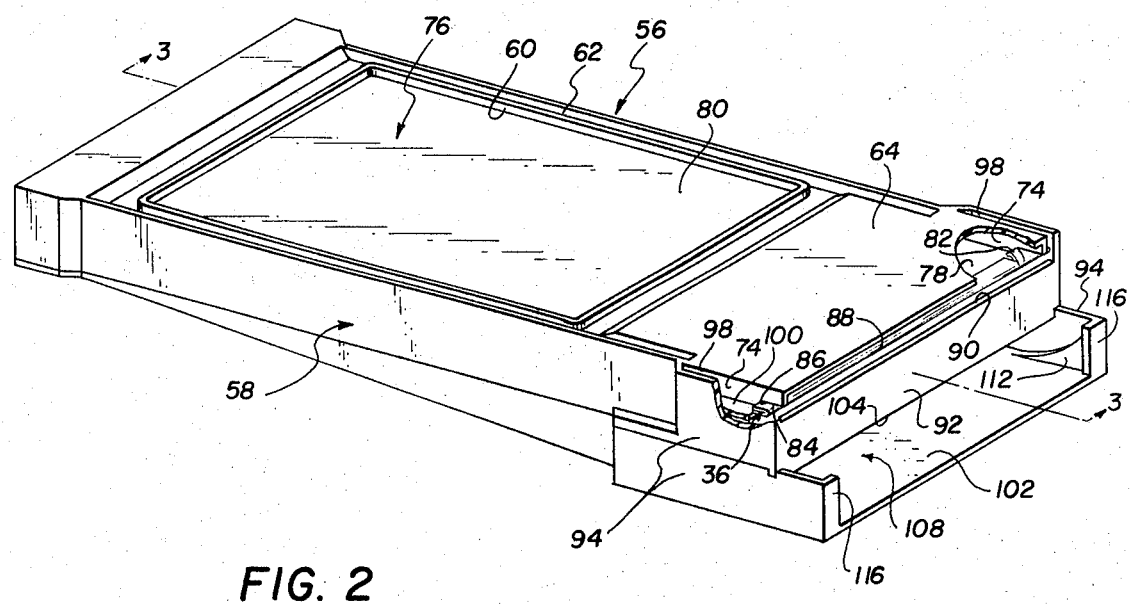
FIG. 2 is a perspective view of a film cartridge or pack including a plurality of film units of the type shown in FIG. 1, with portions of the film pack casing broken away for clarity of illustration.

A self-processable film unit of the general type with which a camera incorporating the present invention is intended to be used is shown in FIG. 1, and a film cartridge or pack including an assemblage or stack of such film units is illustrated in FIGS. 2, 3, and 4. Because details of such film units and film packs are described in the above-cross-referenced U.S. Pat. application Ser. No. 268,932, incorporated herein by reference, such details not essential to an understanding of the present invention have been omitted from this disclosure.

Briefly, the film unit 20, illustrated in FIG. 1, includes an image-recording portion or unit or print card 22, a processing portion or fluid pod assembly 24, and a trap assembly 26. The print card 22 comprises a photosensitive sheet 28 and a transparent cover or process sheet 30, which is permanently attached to the photosensitive sheet along its lateral edges by being permanently bonded to thin lateral spacer rails 32. The photosensitive sheet and the process sheet thus are maintained permanently in superposed or registered relation to each other so that their central or image areas are maintained in alignment but may be spread apart sufficiently to permit distribution of a processing composition therebetween. The image-recording portion or print card is exposed through its transparent process sheet 30 and, after processing, is viewed from the opposite side to provide a rightreading image without recourse to image-reversing mirrors or the like in the camera. The processing fluid introduced between the two sheets is opaque and thereby prevents further exposure of the photosensitive sheet from occurring while the film unit is removed from the camera but before the processing fluid has had time to complete its processing function.

The processing portion of fluid pod assembly 24 includes a resiliently flexible carrier sheet 34 that is provided at its leading edge portion with a permanently attached, relatively rigid stiffening member or bar 36, which preferably is made of plastic or metal and defines the leading end of the film unit. The trailing end portion of the carrier sheet is laterally notched to provide a carrier sheet tongue 38 that is separably coupled to the leading edge portion of the print card by a rupturable adhesive material or the like. Between bar 36 and the leading edge portion of the print card, a processing fluid pod 40 is permanently attached to the carrier sheet. The processing fluid pod may include various cooperating parts which together define a suitable processing composition supplying means. Preferably, the pod comprises a rectangular piece of vapor-impervious material that is folded transversely and then sealed along its lateral edges 42. A rupturable seal or joint is provided along its trailing edge portion 44, which initially is disposed adjacent to the leading edge portion of the print card. A pair of funnel sheets 46 are permanently attached to trailing edge portion 44 and are received between the leading edge portion of photosensitive sheet 28 and a spaced strip 48 attached to the leading edge portion of process sheet 30. During the processing operation, the film unit is transported, leading end first, through a nip defined by a pair of pressure-applying members, as described below. The resulting internal hydraulic pressure developed within the pod ruptures the seal adjacent to the funnel sheets and causes the processing composition to flow from the pod, between the funnel sheets, and into the print card. Because the funnel sheets are not positively joined to the print card, they can thereafter be withdrawn readily from between sheet 28 and strip 48.

At the trailing end of the film unit, the trap assembly 26 comprises a sheet of moisture-impervious material that is folded transversely and then sealed along its lateral edges 50 to define an internal storage chamber, which is prevented from collapsing by an internal plastic support member, not shown. A pair of lips 52 defined by the leading edge portions of the folded trap sheet extend between the trailing edge portions of the photosensitive and process sheets, and are permanently bonded thereto. The confronting surfaces of lips 52 initially are unattached to each other so that excess processing fluid extruded from the trailing edge portion of the print card will enter the trap between those lips and be received in the internal storage chamber. The confronting lip surfaces, and also the confronting surfaces of spacer strip 48 and photosensitve sheet 28, can be coated with an adhesive that is activated by the processing fluid to bond those surfaces together after the processing operation has been completed, leaving the ends of the finished photograph permanently sealed. A scored or otherwise weakened separation line 54 can be provided along each lip portion of the trap to facilitate removal of the trap from the finished photograph. If this feature is provided, the corresponding sealing material activated by the processing fluid preferably extends on both sides of the separation line to seal both the trailing edge portion of the photograph and the leading edge portion of the separated trap.

A plurality of film units of the type described above are supplied in a cartridge or film pack 56, best illustrated in FIGS. 2, 3, and 4. As mentioned above, specific structural details of the film pack are disclosed in greater detail in U.S. Pat. application Ser. No. 268,932. The box-like casing 58 of the film pack is made of plastic or sheet metal and includes a forwardly facing exposure window 60 surrounded by a shallow recess 62 in the casing front wall 64. As best shown in FIG. 3, the film units 20 initially are housed in stacked relation to one another in a film compartment portion 66 of the casing, their print cards being disposed in alignment with exposure window 60. A pressure plate 68 is located behind the print cards of the film units in film compartment portion 66 and is biased forwardly by leaf springs 70 to compress the stack of film units against the casing front wall 64. A pod support spring 72 is carried by the pressure plate and resiliently urges the pod assemblies of the film units forwardly toward guide rails 74 carried by the casing front wall. The portion of the casing that houses the pod assemblies is sufficiently wide to accommodate their stiffening bars, but the remainder of the casing conforms to the width of the print cards to maintain the film units in stacked alignment with one another in film compartment portion 66.

Initially, an opaque cover element 76 is located forwardly of the forwardmost film unit to protect that unit from ambient light. The cover element is substantially identical to the film units except that no pod is provided on its carrier sheet 78 and an opaque disposable card 80 is substituted for the print card and trap assembly of a film unit.

To achieve maximum compactness of the stored film units and to avoid crushing the pod assemblies thereof, the pods 40 are tapered, and the pod assemblies 24 and the cover element carrier sheet 78 initially assume a splayed arrangement, as illustrated in FIG. 3. The carrier sheets are substantially of the same width as disposable card 80 and print cards 22, but the stiffening bars 36 project laterally beyond the other elements of the cover element and film units. As best shown in FIG. 2, the guide rails 74 carried by the casing front wall 64 straddle deformable tabs 82 bent forwardly from the stiffening bars so that the lateral edge portions or tips of the stiffening bar associated with the cover element or the film unit subsequently in exposure position are urged against positioning surfaces 84 of notches 86 in the guide rails. This arrangement aligns the stiffening bar of the cover element or the exposable film unit with an exit slot 88 between the casing front wall 64 and the forward edge 90 of casing end wall 92. The deformable tabs 82 serve to preserve the splayed arrangement of the pod assemblies and to facilitate proper gating and feeding of the successive film units by maintaining a predetermined spacing between the stacked stiffening bars. These and other functions of the illustrated form of stiffening bars are disclosed in greater detail in the above-cross-referenced U.S. Pat. application Ser. No. 268,974.

By reference to FIG. 4, it will be seen that guide rails 74 are joined to the side walls 94 of the wider portion of the film pack casing by recessed walls 96, which terminate at notches 86. This construction provides the front surface of the film pack with slots 98, the bottom surfaces 100 of which are established by the corresponding recessed walls 96. As explained in detail in the aforementioned U.S. Pat. application Ser. No. 268,932, surfaces 100 are located in accurate predetermined relation to the stiffening bar seated against positioning surfaces 84 of guide rails 74 so that a pair of feeder fingers, described below, can be positioned by surfaces 100 to engage the tips of that stiffening bar and deliver the bar properly through exit slot 88 and into the nip of the pressure members.

Behind the portion of the film pack initially containing the pods, the film pack casing extends beyond end wall 92 to provide a chute or porch 102. The rearward edge 104 of casing end wall 92 is spaced from the casing back wall 106 to provide an entrance opening 108 through which waste elements of the film units can be inserted into a storage compartment 110. Guide ramps 112 extend along the side walls 94 of the wider portion of the film pack casing and terminate at ribs 114 adjacent to the transition between the wider and narrower portions of the casing. The confronting internal surfaces of walls 94 are spaced apart slightly farther than the width of the film unit stiffening bars, and the space between the ramps 112 is narrower than the stiffening bars but wider than the carrier sheets so that the ramps engage only the tips of the stiffening bars. At the end of the chute or porch, retaining walls 116 extend toward each other from walls 94 and are spaced by a distance less than the width of the major or leading end portion of the carrier sheet but greater than the width of the minor or trailing end portion or tongue of the carrier sheet.

Figure 5:
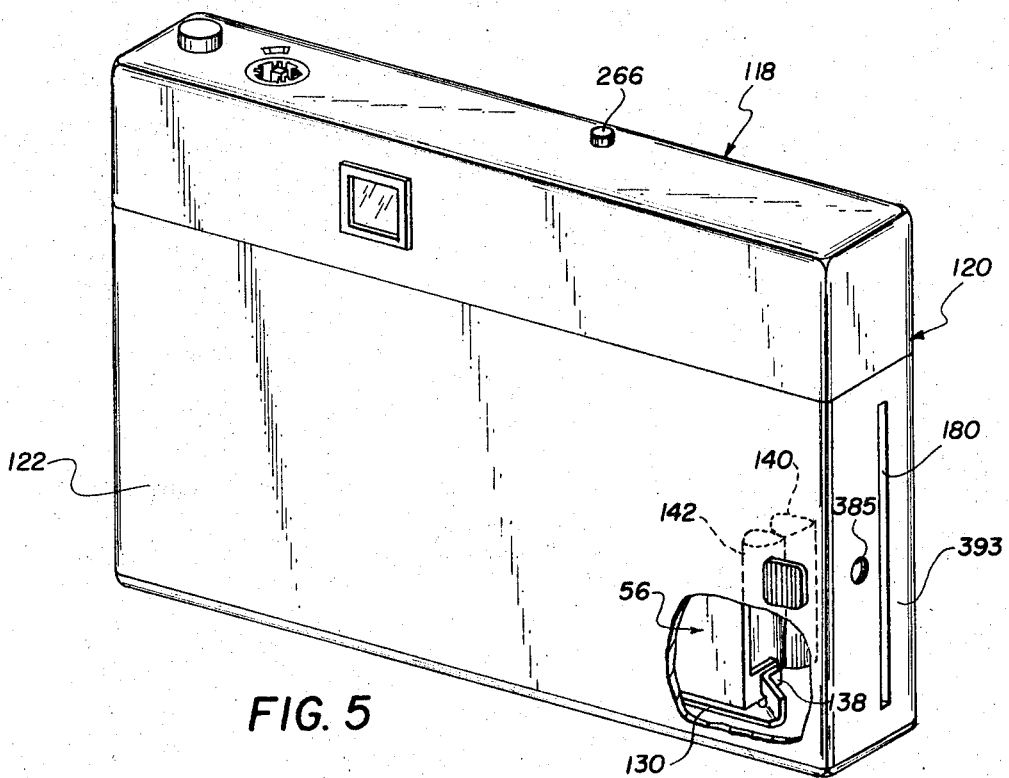
FIGS. 5 and 6 are perspective views of a camera incorporating a processing mechanism constructed in accordance with the preferred embodiment of the present invention, with portions of the camera housing broken away for clarity of illustration.
Figure 6:
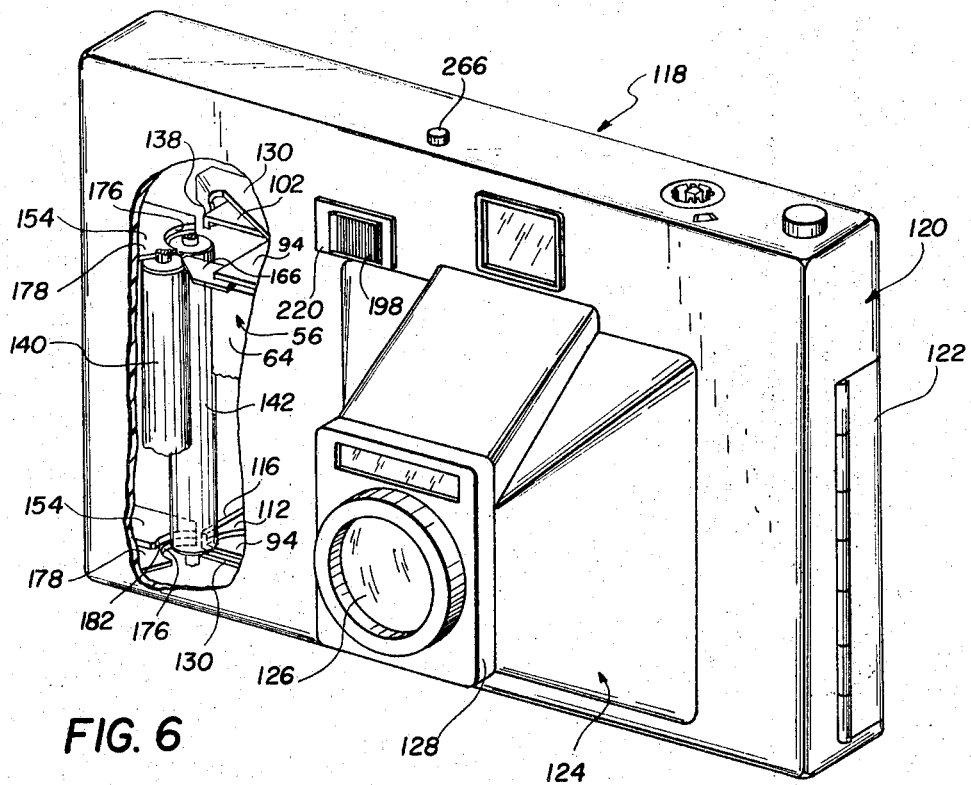
Figure 7:
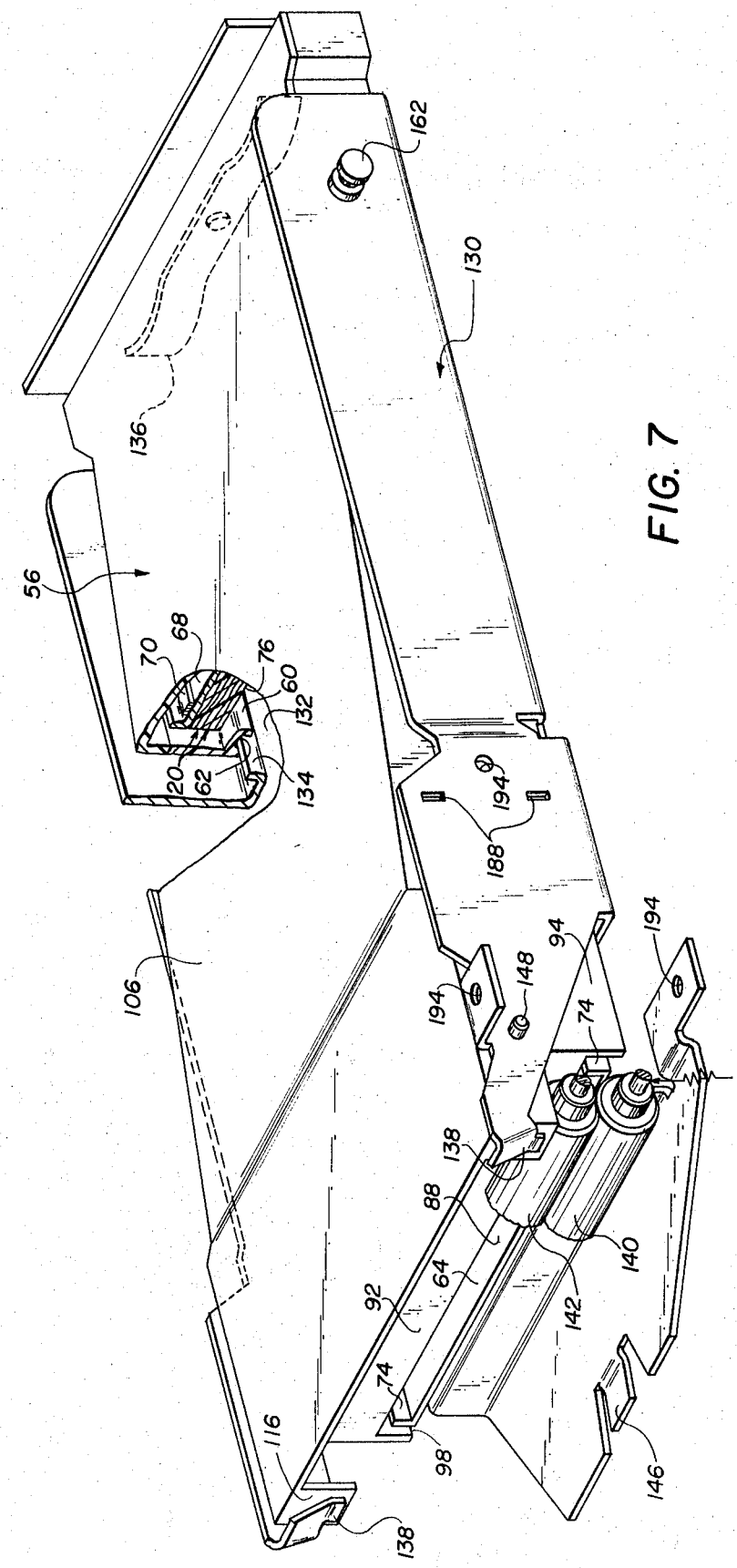
FIG. 7 is a perspective view of an internal support member or shell of the camera shown in FIGS. 5 and 6, illustrating a film pack of the type shown in FIGS. 2-4 in its operable position in relation to a pair of pressure members in the camera.

A camera 118, adapted to receive film pack 56 and incorporating a film unit processing mechanism constructed in accordance with the preferred embodiment of the present invention, is illustrated in FIGS. 5 and 6. The camera comprises a box-like housing 120 which is provided with a latchable hinged loading door 122 and a forwardly projecting extension 124 supporting the camera lens 126 and shutter assembly casing 128. The processing mechanism to which the present invention is directed is located within the camera housing and is supported by a support member or shell 130, best shown in FIGS. 7 and 8. The support member or shell 130 is rigidly secured to the camera housing and includes a forwardly facing opening 132 straddled by two positioning ribs 134. When the film pack is loaded into the camera, it is received by shell 130 and is seated against ribs 134, which are located within the corresponding channels of recess 62 surrounding the exposure window 60 of the film pack. A resilient leaf spring 136 urges the film pack endwise into positioning abutment with ears 138 of the shell, and a similar spring (not shown) on the inside face of the loading door engages the back wall of the film pack to hold the pack in seated engagement with the shell ribs 134. Accordingly, the film pack is accurately located within the camera to position the emulsion surface of an exposable film unit in coincidence with a focal plane of the camera lens 126.

When the film pack is in its loaded position, its exit slot 88 is aligned with the nip defined by a pair of juxtaposed, rotatable pressure members such as rollers 140 and 142. The two rollers preferably are carried by a removable roller subassembly or carriage comprising a frame 144, partially shown in FIG. 9. The subassembly is removaly attached to shell 130 by means of shell tang 146 and studs 148 to allow the rollers to be removed from the camera for cleaning. Further details of the roller subassembly will be described hereinafter with reference to FIGS. 17-20. For present purposes, however, it should suffice to explain that the forward roller 140 is resiliently biased toward the rearward roller 142 to provide a firm but yieldable pressure at the roller nip, and that the two rollers are coupled for positive opposite rotation by their respective gears 150 and 152. Adjacent to the side of the roller nip opposite the film pack, the removable subassembly also includes a pair of guide shoes 154, shown in FIGS. 6, 10, 11, 17, 18, and 19, the function of which will be described briefly below.

Referring now particularly to FIGS. 8-11, the processing mechanism comprises a feeder member or shuttle 156 mounted on shell 130 for reciprocative sliding movement by studs 158 extending through slots 160 and by stud 162 extending through slot 164. A pair of feeder fingers 166 on the shuttle are adapted to be received in slots 98 of the film pack, with the rearward finger surfaces 168 held in light resilient engagement with film pack slot surfaces 100 by the influence of relatively weak spring blades or washers 170 under the heads of studs 158. While this resilient finger-positioning feature is not essential to the operation of the mechanism, it allows the feeder fingers to be positioned by the film pack without compromising the accurate location of the pack, thereby avoiding the dimensional tolerances that otherwise would be required to maintain the fingers in very close proximity to surfaces 100 but not actually in contact with them.

Figure 9:
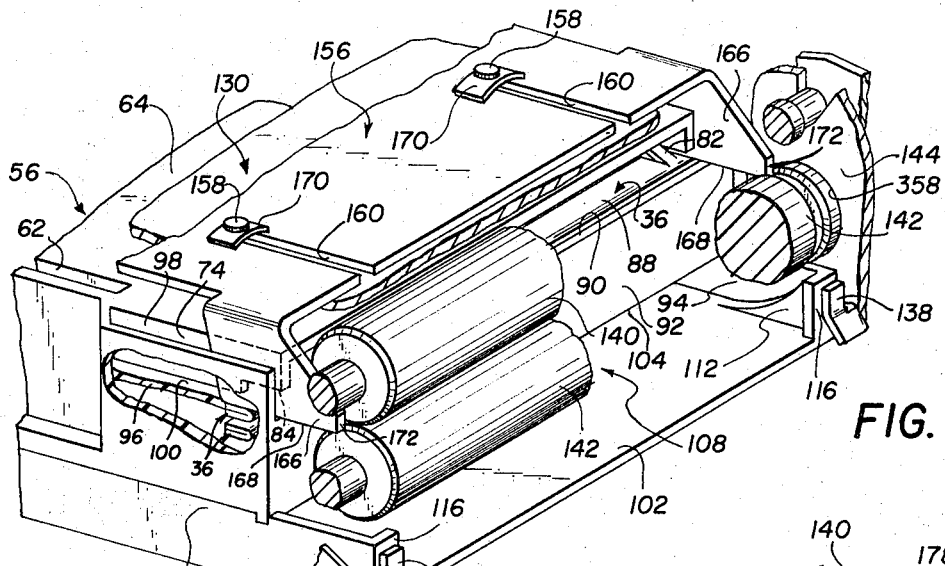
FIG. 9 is a perspective view of a portion of the structure shown in FIGS. 7 and 8, illustrating cooperation between the film pack and components of the processing mechanism.
Figure 10:
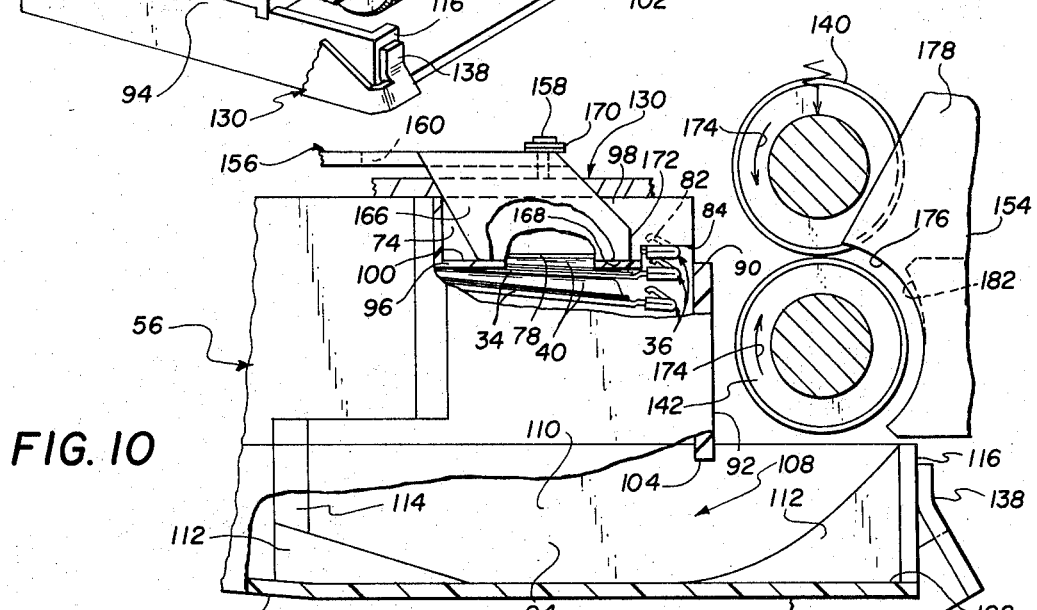
FIGS. 10 and 11 are partial elevational views corresponding generally to FIG. 9 and illustrating successive stages in the operation of the processing mechanism.
Figure 11:
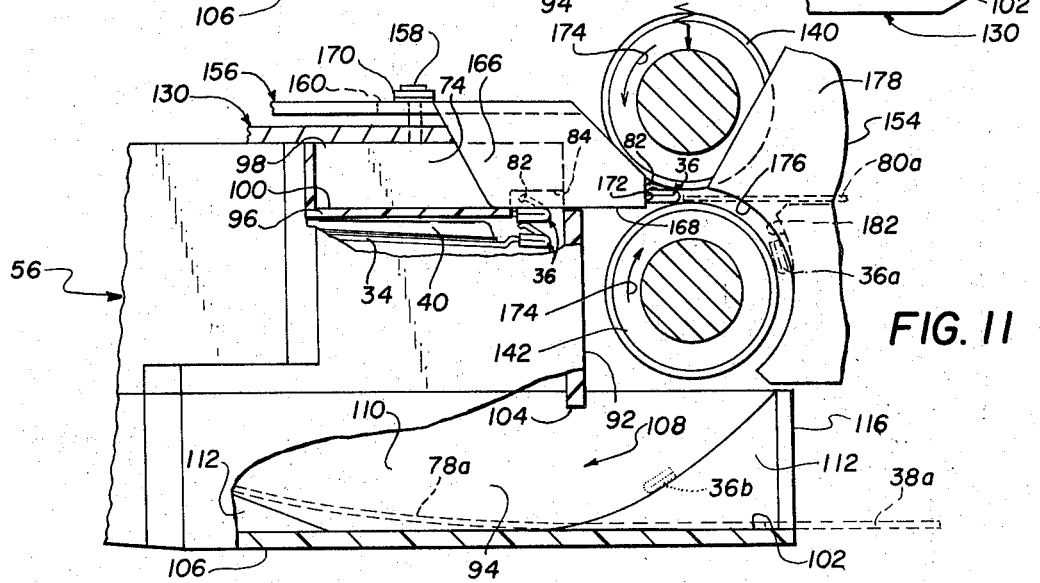

When the film pack is loaded into the camera, the shuttle is located in its initial or first position, shown in FIG. 9, whereby surfaces 168 of fingers 166 engage the tips of the cover element stiffening bar 36 and displace that bar rearwardly out of contact with positioning surfaces 84 of guide rails 74 and out of alignment with exit slot 88. When the shuttle is subsequently moved to its retracted or second position, shown in FIG. 10, fingers 166 are beyond engagement with the cover element stiffening bar, which is then urged into engagement with guide rail surfaces 84 and into alignment with exit slot 88 under the influence of pod support spring 72. The return of the shuttle to its initial position, illustrated in FIG. 11, causes the abutment ends 172 of fingers 166 to engage the tips of the cover element stiffening bar and move the bar into the nip between rollers 140 and 142, which are then rotating in opposite directions as shown by arrows 174. As soon as the cover element stiffening bar enters the roller nip, the bar is driven through the nip by the rollers, and its tabs 82 are flattened by the nip pressure. Upon emerging from the nip, the tips of the bar engage outer surfaces 176 of the pair of guide shoes 154, which are located adjacent to the respective ends of the rollers as shown in FIG. 6. Guide shoes 154 direct the bar rearwardly around roller 142, as shown by broken lines at numeral 36a in FIG. 11, and into engagement with guide ramps 112, which direct the bar toward the storage compartment 110, as shown by broken lines at numeral 36b in FIG. 11. As continued movement of the cover element brings the leading edge portion of its card 80 through the roller nip, the card passes between the outer parts 178 of the guide shoes, as shown by broken lines at numeral 80a in FIG. 11, and the inherent stiffness of the card causes it to continue moving in substantially the same planar path so that it emerges from the camera through camera exit slot 180, shown in FIGS. 5 and 19. Cooperation between the carrier sheet 78 of the cover element and the inner guide surfaces 182 of the guide shoes causes the carrier sheet to become separated from the card and to assume a substantially flat position in storage compartment 110, as shown by broken lines at numeral 78a in FIG. 11, with the tongue of the carrier sheet extending between retaining walls 116 of porch 102, as indicated by numeral 38a. During the separation of the carrier sheet from the card, the shuttle remains in its initial position as shown in FIG. 11, and thereby maintains the stiffening bar of the first available film unit rearwardly of exit slot 88 to prevent endwise movement of that film unit through the slot. After completion of the operating cycle, rotation of the rollers terminates and the shuttle remains in its initial position until the next operating cycle is initiated.

After exposure of the first film unit, activation of the processing mechanism causes the shuttle to move again to its second position so that it can engage the stiffening bar of that unit, whereupon the shuttle returns to its initial position to move the bar into the roller nip. Rotation of the rollers then drives the exposed film unit through the nip and effects separation of its pod assembly from its print card in the manner described above. In the case of a film unit, however, the roller assembly also serves to rupture the processing fluid pod and distribute the processing fluid between the sheets of the print card, as previously described. A more detailed description of the guide shoes and the manner in which the processing and separating functions are performed is presented in the above-cross-referenced U.S. Pat. application Ser. No. 268,930 (now U.S. Pat. No. 3,762,290). For purposes of the present disclosure, however, it should suffice to explain only that each operating cycle requires a single reciprocative movement of the shuttle from its initial or first position to its second position and then back to its initial position, all in timed coordination with rotation of the rollers through a sufficient number of revolutions to ensure movement of the cover element or film unit entirely through the roller nip.

Figure 8:
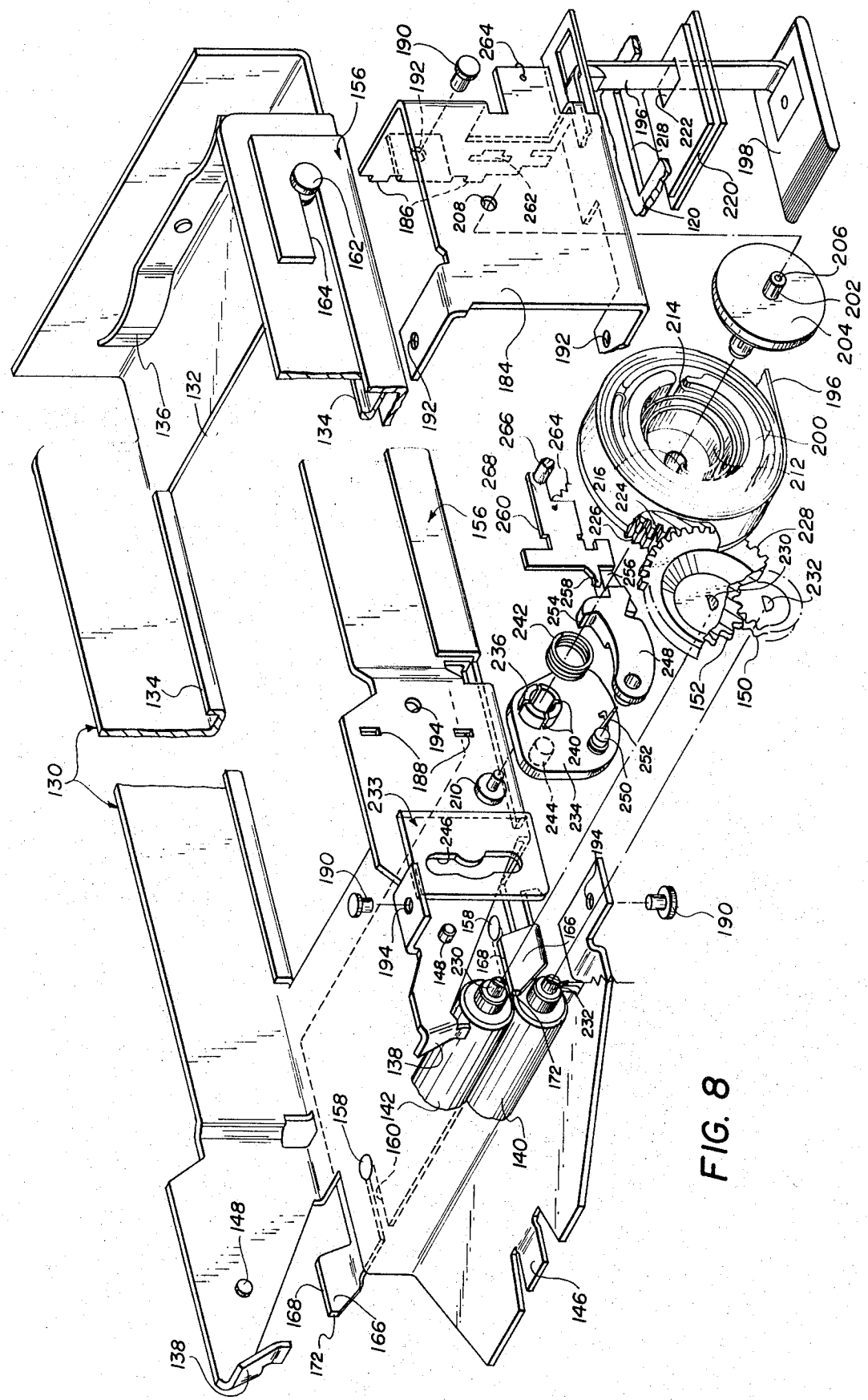
FIG. 8 is an exploded perspective view of the internal support member or shell shown in FIG. 7, illustrating further details of the shell and various components of the processing mechanism of the present invention associated therewith.

The preferred embodiment of the present invention is particularly directed to the processing mechanism illustrated in FIGS. 8 and 12–14, which operates both the feeder member or shuttle and the two processing rollers. As best shown in FIG. 8, this mechanism comprises a mounting plate 184 that is securely attached to shell 130 by tabs 186, which mate with and are received in slots 188 of the shell, and by rivets 190 or other appropriate securing means, which extend through holes 192 in the mounting plate and cooresponding holes 194 in the shell. A flexible elongate lanyard 196, preferably made of a strip of tough resilient plastic material, is permanently attached at one end to a pulling tab 198 and at its other end to a barrel or spool 200, onto which the lanyard is normally wound. The barrel or spool, in turn, is rotatably mounted on a stationary tubular arbor 202 which is provided with a spring retaining disk 204. One end 206 of arbor 202 is supported by being staked permanently into hole 208 in mechanism plate 184, and a rivet 210 or its equivalent at the other end of the arbor holds in place the components mounted on the arbor. The lanyard is resiliently maintained in a wound-up condition on the barrel or spool by a spiral or scroll spring 212 wound within the barrel with its opposite ends 214 and 216 secured, respectively, to the barrel and the arbor, whereby the lanyard will be returned to and maintained in its wound-up condition when released. The lanyard extends through an opening 218 in the front wall of the camera housing 120 so that its pulling tab 198 is accessible from the exterior of the camera, as shown in FIG. 6. As illustrated in FIG. 8, opening 218 preferably is covered by a cover plate 220 provided with a smaller opening 222 through which the lanyard passes. Because pulling tab 198, and preferably also cover plate 220, can be passed diagonally through opening 218 in the housing, this arrangement allows the lanyard to be wound into the barrel and attached to the tab before the mechanism assembly shown in FIG. 8 is installed in the camera.

Figure 12:
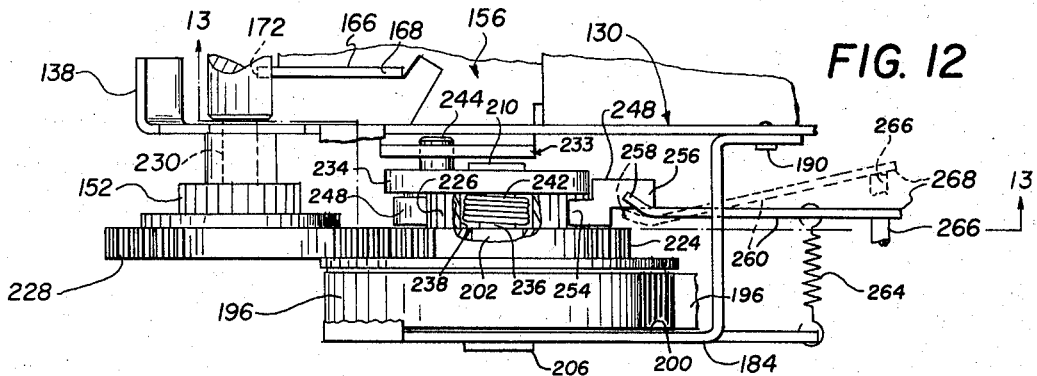
FIG. 12 is a fragmentary plan view of the assembled drive elements shown in FIG. 8.

The barrel 200 preferably is made of molded plastic and includes an integral drive gear 224 and an integral pawl wheel 226, best depicted in FIGS. 8 and 12. When the lanyard is pulled to operate the processing mechanism, the barrel is rotated on the arbor and thereby rotates a driven gear 228 which is meshed with drive gear 224. The barrel 200 thus serves as a rotatable power-input member for the processing mechanism. An appropriate governor or the like, not shown, can be associated with gear 228, or with some other rotatable element of the drive mechanism, to control the rate of rotation of the barrel in either or both directions. Driven gear 228 is carried by the corresponding end shaft 230 of the rearward drive roller 142, which also carries the aforementioned roller gear 152, which in turn is meshed with the aforementioned similar gear 150 mounted on end shaft 232 of the forward roller 140. The roller end shafts 230 and 232 and the corresponding gears 228 and 152 and 150 are provided with appropriate mating flats, or the equivalent, to prevent relative rotation between the shafts and their respective gears. As is well known in the art of synchronizing pressure-applying rollers, gears 152 and 150 have relatively long teeth that remain in mesh while accommodating variations in the thickness of the nip between the rollers. Because gears 228, 152, and 150 are permanently secured to the ends of the rollers, those gears are removable from the camera with the aforementioned roller subassembly, and driven gear 228 is automatically remeshed with drive gear 224 when the roller subassembly is reinstalled in the camera.

Shuttle 156 is driven by a reciprocative motion-converting device of the general type known as a Scotch yoke drive, which comprises a yoke plate 233 integral with the shuttle. A shuttle driver member 234 is mounted for rotation on the stationary arbor 202 by its central hub 236, which extends into enlarged bore 238 of pawl wheel 226 as shown in FIG. 12. Hub 236 is slotted in collet fashion as shown at numeral 240 and is surrounded by a helical spring member 242 that compresses the hub inwardly to maintain its central bore in light frictional engagement with arbor 202. The face of the shuttle driver member adjacent to yoke plate 233 carries an offset crank pin 244 which is received in a cam or control slot 246 of the yoke plate. During the period between successive operating cycles, the crank pin 244 is positioned at the center of the control slot 246 and is at its position closest to the rollers, thereby locating shuttle 156 at its initial position depicted in FIGS. 8, 9, 11, 13, and 15. As the shuttle driver member is rotated through a complete revolution, it will be apparent that the crank pin drives the shuttle from its initial position to its retracted position shown in FIGS. 10 and 14 and then back to its initial position. Because of the geometry of the crank pin and the control slot, it will also be apparent that the greatest mechanical advantage is achieved when the pin is located near the center of the slot, thus minimizing the force that must be applied in pulling the lanyard to initiate the film processing operation.

Figure 15:
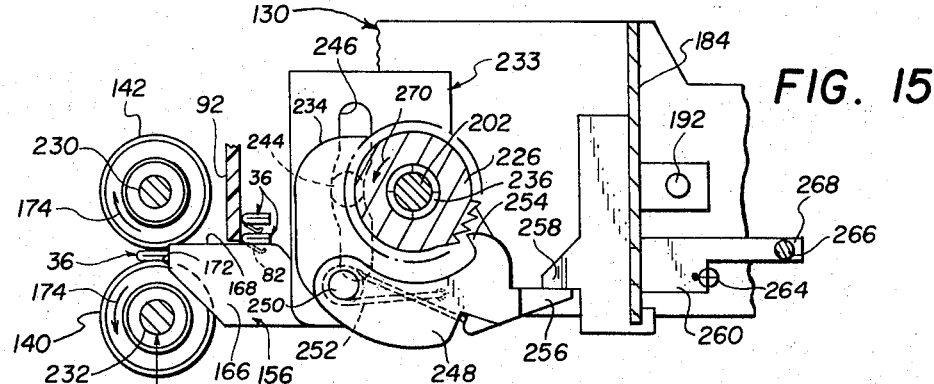
FIGS. 13-15 are broken-away elevational views of the structure shown in FIGS. 9 and 12, illustrating the positions of certain components at successive stages of an operating cycle.
Figure 13:
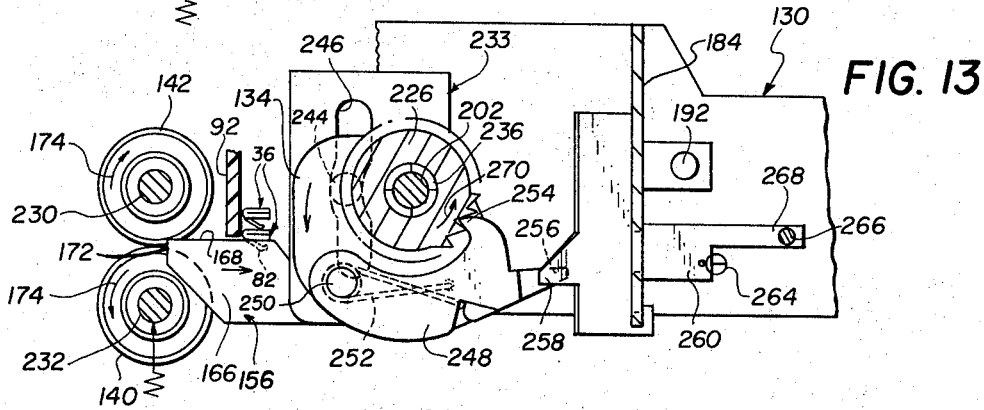
Figure 14:
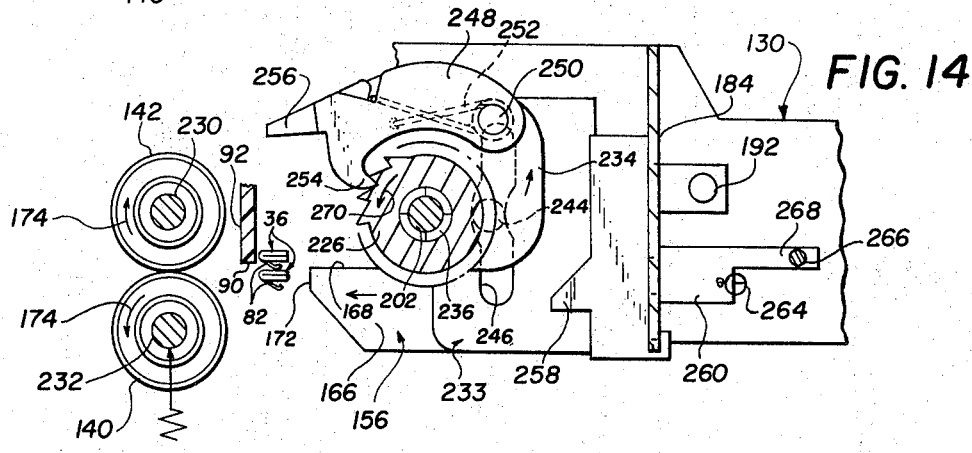

A pawl member 248 is pivotally mounted on a pin 250 on the shuttle driver member and is resiliently biased by a relatively weak pawl spring 252 to urge pawl tooth 254 toward engagement with the peripheral teeth of pawl wheel 226. Before the initiation of a processing cycle, ear 256 of pawl member 248 is engaged by a clutch release finger 258 of a blocking plate 260, which holds the pawl member out of engagement with the pawl wheel as shown in FIG. 15. The blocking plate is rockably received in slot 262 of the mechanism plate, shown in FIG. 8, and is resiliently urged by spring 264 to its blocking position, shown in solid lines in FIG. 12, at which the blocking plate finger 258 can encounter pawl member ear 256 and thereby disengage the pawl from the pawl wheel. When the film pack is initially loaded into the camera, therefore, withdrawal of the lanyard would effect rotation of the drive rollers but would not cause reciprocation of the shuttle because of the disengagement of the pawl member from the pawl wheel. Accordingly, a manually operatable push button 266, illustrated in FIGS. 5, 6, 8, and 12, is in alignment with ear 268 of the blocking plate to allow the photographer to disengage clutch release finger 258 from pawl member ear 256 and thereby engage the pawl member with the pawl wheel. When button 266 is momentarily depressed, to rock the blocking plate out of engagement with the pawl member as shown in broken lines in FIG. 12, movement of the pawl member into engagement with the pawl wheel under the influence of spring 252 locates the pawl member ear beside the clutch release finger, as shown in FIG. 13, whereby the clutch release finger cannot prevent rotation of the shuttle driver member. As the lanyard is pulled, the pawl wheel therefore drives the shuttle driver member in the direction shown by arrow 270 in FIGS. 13-15 and thereby effects reciprocation of the shuttle from its initial or first position shown in FIG. 13 to its retracted or second position shown in FIG. 14 and then back to its initial or first position. After the shuttle driver member has completed a single revolution, however, the pawl ear again engages the clutch release finger as shown in FIG. 15 to terminate the reciprocation of the shuttle. It will thus be seen that shuttle driver member 234, pawl member 248, and blocking plate 260 coact to provide a single-revolution clutch that is coupled, by pin 244 and slot 246, to the feeder member or shuttle 156 and which has an element, in the form of pawl member 248, that is couplable, by pawl tooth 254 and pawl wheel 226, to the power-input member or barrel 200 for rotation thereby through a single revolution only of the barrel, to effect a single reciprocation only of the shuttle during a processing cycle. When this occurs, the shuttle has completed its movement from its initial or first position to its retracted or second position and then back to its initial position, and has thereby moved the stiffening bar of the cover element into the roller nip, as shown in FIG. 15, whereupon continued withdrawal of the lanyard causes the rollers to continue rotating until the lanyard is completely unwound from barrel 200. The length of the lanyard and the ratio of the various gears is such that complete lanyard withdrawal causes sufficient rotation of the rollers to drive the cover element or film unit completely through the roller nip. During the lanyard rewinding operation, the pawl member tooth 254 remains out of engagement with the teeth of the rotating pawl wheel, and the shuttle driver member 234 remains stationary. Consequently, rewinding of the lanyard completes the operating cycle and restores the various mechanism components to their initial condition. After each film unit has been exposed, push button 266 is again depressed to reengage the single-revolution clutch so that subsequent withdrawal of the lanyard will effect processing of that unit.

Figure 16:
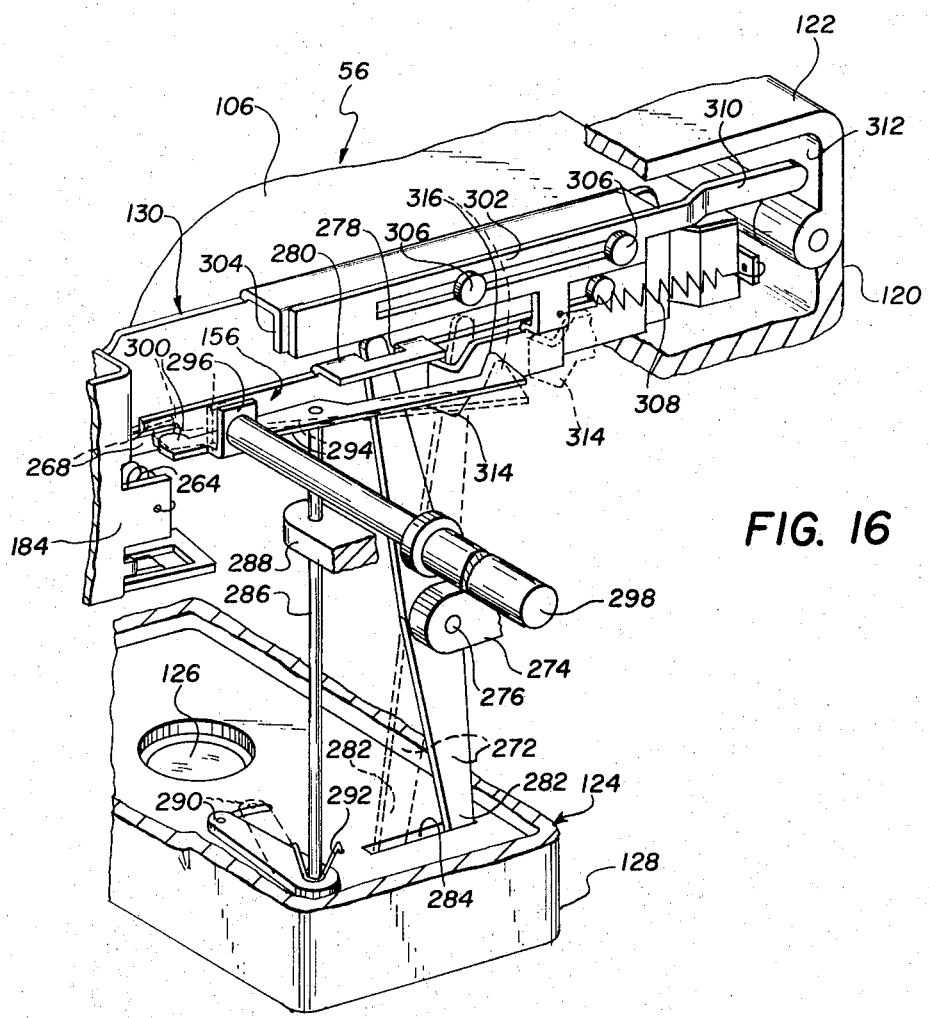
FIG. 16 is a fragmentary perspective view of the camera shown in FIGS. 5 and 6, illustrating structure therein for automatically coordinating operations of the film processing and camera shutter mechanisms and for automatically setting the film processing mechanism when a film pack is inserted into the camera.

FIG. 16 shows a portion of the mechanism already described in combination with a device for operating the camera shutter housed within shutter assembly casing 128. In this arrangement, a shutter cocking lever 272 is pivotally supported on a mounting arm 274 of the camera housing 120 by a pivot pin 276. The rearward end of the cocking lever is received in an opening 278 in an ear 280 of the shuttle 156, whereby the reciprocative movement of the shuttle reciprocates the lever from its initial position shown in solid lines to a second position shown in broken lines and then back to its initial position. As will be apparent to those skilled in the camera art, the front end 282 of lever 272 extends into casing 128 through a slot 284 and is operatively engaged with the shutter, not shown, to translate such reciprocative movement into cocking of the shutter. A shutter release rod 286 is supported for rotational movement by the shutter assembly casing and by a support arm 288 of the camera housing. Rod 286 is adapted to release the shutter when it is rotated to move its release arm 290 from the position shown in solid lines to the position shown in broken lines, in opposition to a weak hairpin spring 292. At its rearward end, shutter release rod 286 carries an operating lever 294 provided with an ear 296 engageable by an externally accessible shutter release button 298 that is substituted for the previously described push button 266. When button 298 is depressed, lever 294 is displaced to the position shown in broken lines, thereby rotating rod 286 and releasing the shutter. Concurrently, nose 300 of lever 294 engages ear 268 of blocking plate 260 and displaces the blocking plate to activate the clutch by disengaging clutch release finger 258 from pawl member 248. Because the clutch is inoperative to drive the shuttle until the shutter release button has been depressed to produce an exposure, this arrangement provides positive "no-exposure" prevention by ensuring that withdrawal of the lanyard cannot effect movement of a film unit unless the shutter has been operated to expose that unit. Furthermore, because the shutter is cocked by movement of the shuttle during the processing operation, this structure also provides "double-exposure" prevention to eliminate the possibility of accidentally exposing the same film unit twice.

Another feature of the construction shown in FIG. 16 eliminates the need to engage the clutch of the processing mechanism manually prior to removal of the cover element after a film pack has been inserted into the camera. This function is accomplished by means of a clutch actuating plate 302, which is slidably mounted on a lip 304 of shell 130 by rivets 306. A spring 308 urges plate 302 toward the right, as viewed in FIG. 16, but a tongue 310 at the right end of the plate is adapted to engage inner surface 312 of the closed and latched cover door 122, which thereby holds the plate in the position shown in solid lines in opposition to the spring. At its opposite end, plate 302 is bent to provide a cam lobe 314 aligned with a cam follower nose 316 at the corresponding end of lever 294. When the operator releases the door latch and opens the cover door to insert a film pack, spring 308 moves the plate 302 to the right to displace cam lobe 314 from the position shown in solid lines to the position shown in broken lines, whereby the cam lobe momentarily displaces lever 294 to its position shown in broken lines and thereby actuates the clutch. During closing movement of the door, movement of the cam lobe back to its initial position again moves lever 294 momentarily to the position shown in broken lines. This second movement of lever 294 normally has no influence on the processing mechanism but ensures that the clutch is engaged if the lanyard has been pulled while the door is open during insertion of the film pack. Alternatively, the clutch could be actuated in a similar fashion by the removing or inserting movement of the film pack itself, for example, by means of a cam lobe formed integrally with the film pack casing. The essential consideration, therefore, it not the particular mechanism employed to release the clutch but rather that this operation is accomplished automatically in response to the performance of a physical movement necessary to removal or insertion of a film pack.

Illustrated in FIGS. 17–20 is the aforementioned roller subassembly or carriage which permits removal of the two rollers 140 and 142 and the pair of guide shoes 154 from the camera for cleaning. As best shown in FIG. 17, the subassembly or carriage includes main carriage frame 144, previously referred to as partially shown in FIG. 9, which fixedly supports and locates the guide shoes relative to roller 142, which in turn is rotatably supported by reception of its end shafts 230 in bearing holes 358 in the carriage frame. The end shafts 232 of roller 140 are rotatably and translatably received in slots 359 of the carriage frame and also in slots 361 of corresponding arms 363. One end of each arm is pivotally coupled to the carriage frame by a pin 356, and a spring 367 at its opposite end biases it toward roller 142 and into engagement with a tab 368 projecting laterally from each side of the carriage frame. Tabs 368 are so located as to keep the rollers spaced apart by an amount less than the film unit thickness, thereby preventing springs 367 from exerting compressive pressure on the rollers until a film unit has entered the nip. This feature removes virtually all friction from the roller bearings and thus renders the rollers freely rotatable when a film unit is not in the nip. Such rotational freedom enables spring 212 to return lanyard 196 to its wound-up condition on barrel 200 with minimal frictional resistance, and facilitates cleaning of both the rollers and the guide shoes when the subassembly or carriage is removed from the camera.

The subassembly or carriage is releasably retained and located in the camera by a first latching surface 369 adapted to be straddled by the aforementioned offset tang 146 of the shell 130 and by a latching bracket 373 pivotally mounted on the carriage frame by pins 375. Bracket 373 comprises two latching arms 377 provided with coupling notches 379 which engage the aforementioned latching studs 148 on shell 130 when those studs are received in frame slots 383. The same springs 367 that apply the compressive force to the roller nip also are attached to bracket 373 to maintain thereby arms 377 in latching engagement with studs 148.

As shown in FIG. 19, the subassembly or carriage is removable from the rest of the camera by inserting a coin in the slotted head of latch release cam member 385 and rotating the cam member so that its eccentric or cam 387 engages and displaces surface 389 of the latching bracket 373 to pivot its arms 377 out of latching engagement with studs 148. To reinstall the subassembly in the camera, the operator need simply push it back into place after returning the slotted cam member head to its original position. During this movement, as shown in FIG. 20, the ramp surfaces 391 of the latching arms engage latching studs 148 and momentarily displace bracket 373 in opposition to springs 367 to allow the latching studs to reenter frame slots 383 and coupling notches 379. Because an end section 393 of the camera casing is removed with the subassembly, as shown in FIG. 19, no separate access door need be provided.

The invention has been described in detail with particular reference to the preferred embodiment thereof, but it will be understood that variations and modifications can be effected within the spirit and scope of the invention.

What is claimed is:

1. In a camera for effecting exposure and processing of a self-processable film unit, the film unit including an image-recording portion and a processing portion, the camera including a housing having means for supporting the film unit in an exposure position, a shutter operable to effect the exposure, means defining an exit slot, a reciprocable feeder member mounted for initial movement from a first position to a second position and return movement to said first position, said feeder member being engageable with the film unit to move the film unit from the exposure position toward the exit slot during one of said initial and return movements, a pair of rotatable pressure members juxtaposed to define a nip for receiving the film unit when moved thereto from the exposure position, and a rotary power-input member coupled to one of said pressure members and rotatable through more than one revolution during a processing cycle for rotating said one pressure member enough to move the film unit substantially completely through said nip, an improvement comprising:

a. a single-revolution clutch coupled to said feeder member and having an element couplable to said power-input member for rotation thereby through a single-revolution only of said power-input member, to effect a single reciprocation only of said feeder member during the processing cycle; and
 b. means interconnecting said feeder member and the shutter for cocking the shutter in response to one of said initial and return movements of said feeder member.

2. In a camera for effecting an exposure and initiating processing of a self-processable film unit, the film unit including an image-recording portion and a processing portion, the camera including a housing having an end wall with an exit slot therein, a chamber within the housing defining a film unit exposure position, and a shutter operable to effect the exposure, a mechanism comprising:

a. a pair of juxtaposed rotatable pressure members mounted between the chamber and the end wall and defining a nip for receiving the film unit when moved along a substantially straight path extending from the exposure position toward the exit slot;
 b. means rotatable through a plurality of revolutions during a processing cycle for rotating said pressure members enough to move the film unit substantially completely through said nip toward the exit slot;

c. a reciprocable feeder member mounted for initial movement in a first direction extending from said pressure members toward the chamber and for return movement in a second direction substantially opposite to said first direction, said feeder member being engageable with the film unit to move the film unit along said path from the exposure position to said nip during said return movement;

d. means activatable for effectuating said initial and return movements of said feeder member to move the film unit from the exposure position to said nip, said effectuating means including a motion converting device coupled to said feeder member and couplable to said rotating means for converting rotational motion of said rotating means to translational motion of said feeder member, said effectuating means further including a single-revolution clutch activatable to so couple said motion converting device to said rotating means through one only of said plurality of revolutions of said rotating means during the processing cycle; and e. means for cocking the shutter in response to one of said initial and return movements of said feeder member, whereby the film unit cannot be exposed more than once before the processing is initiated.

* * * * *

Disclaimer 3,810,210.—*Henry S. Adamski*, Webster and *Guilford E. Kindig*, Rochester, N.Y. FILM UNIT PROCESSING MECHANISM. Patent dated May 7, 1974. Disclaimer filed Oct. 13, 1981, by the assignee, *Eastman Kodak Co.*

Hereby enters this disclaimer to claims 1 and 2 of said patent.

[*Official Gazette December 22, 1981.*]